CRYSTALLIZATION VELOCITIES
OF $Na_2B_4O_7 \cdot 5H_2O$
FROM ML N°1

INVENTOR.
HENRY B. SUHR
BY Lyon & Lyon
ATTORNEYS

March 13, 1956 H. B. SUHR 2,738,254
PROCESS FOR THE SEPARATION OF SODIUM TETRABORATE
FROM LIQUORS CONTAINING BOTH SODIUM
TETRABORATE AND POTASSIUM CHLORIDE
Filed Nov. 20, 1952 3 Sheets-Sheet 3

INVENTOR.
HENRY B. SUHR
BY
ATTORNEYS

United States Patent Office 2,738,254
Patented Mar. 13, 1956

2,738,254

PROCESS FOR THE SEPARATION OF SODIUM TETRABORATE FROM LIQUORS CONTAINING BOTH SODIUM TETRABORATE AND POTASSIUM CHLORIDE

Henry B. Suhr, Antofagasta, Chile, assignor to American Potash & Chemical Corporation, Trona, Calif., a corporation of Delaware Application November 20, 1952, Serial No. 321,560

5 Claims. (Cl. 23—38)

The present invention relates to improvements to existing processes for the separation and recovery of potassium chloride and sodium tetraborate from natural brines, such as those found at Searles Lake, California. In particular, this invention relates to improvements on the process in use at the plant of the American Potash & Chemical Corporation in Trona, California, which process in turn constitutes an improvement on the processes covered by expired United States Patents Nos. 1,343,401, 1,712,787 and 1,787,356.

It is a primary object of the present invention to provide a new, efficient and economic system for crystallizing and separating sodium tetraborate on a commercial scale from liquors supersaturated with the same, and principally from liquors derived from the concentration of Searles Lake brine and processed according to United States Patents Nos. 1,343,401, 1,712,787 and 1,787,356, and improvements thereon.

Other objects include: (1) increased evaporator efficiency resulting from eliminating the introduction of certain diluting liquors or water into the process cycle; (2) increased potassium chloride production as a result of evaporating increased quantities of brine due to the greater evaporative efficiency; (3) elimination of a costly ammonia-refrigeration step in the cyclic process; (4) the production of a sodium tetraborate free of phosphate impurities; and (5) the elimination of the phosphate-removal step of the process as described in United States Patent No. 1,739,091.

Other objects and advantages of the invention will appear as the description proceeds.

Although the present invention is described in terms of potassium chloride and sodium tetraborate as related to their recovery from Searles Lake brines, it is quite obvious that the process hereinafter described may be of value for the manipulation of any similar brine or liquor having like characteristics.

Since the present invention not only introduces a new and more efficient method of obtaining sodium tetraborate from liquors such as Searles Lake or like brines but also greatly increases the efficiency of the entire process of extracting potassium chloride and sodium tetraborate from such liquors, the attractive qualities introduced by this invention must be accompanied by a description of the prior art. In order to illustrate this improved application of selective crystallization to a natural brine containing potassium chloride and sodium tetraborate, it is appropriate to describe this invention in conjunction with the above-enumerated patents. Moreover, it is proper, in order to understand the over-all cyclic process involved in the concentration and crystallization of Searles Lake brines, to refer to the basic concentration process and the basic KCl-crystallization process, as covered by United States Patents Nos. 1,712,787 and 1,921,481 respectively. The following description is supplemented by a drawing, which represents a flow sheet of the improved process, and graphs, which reveal the basic principles involved in developing the improved process.

Figure 4:
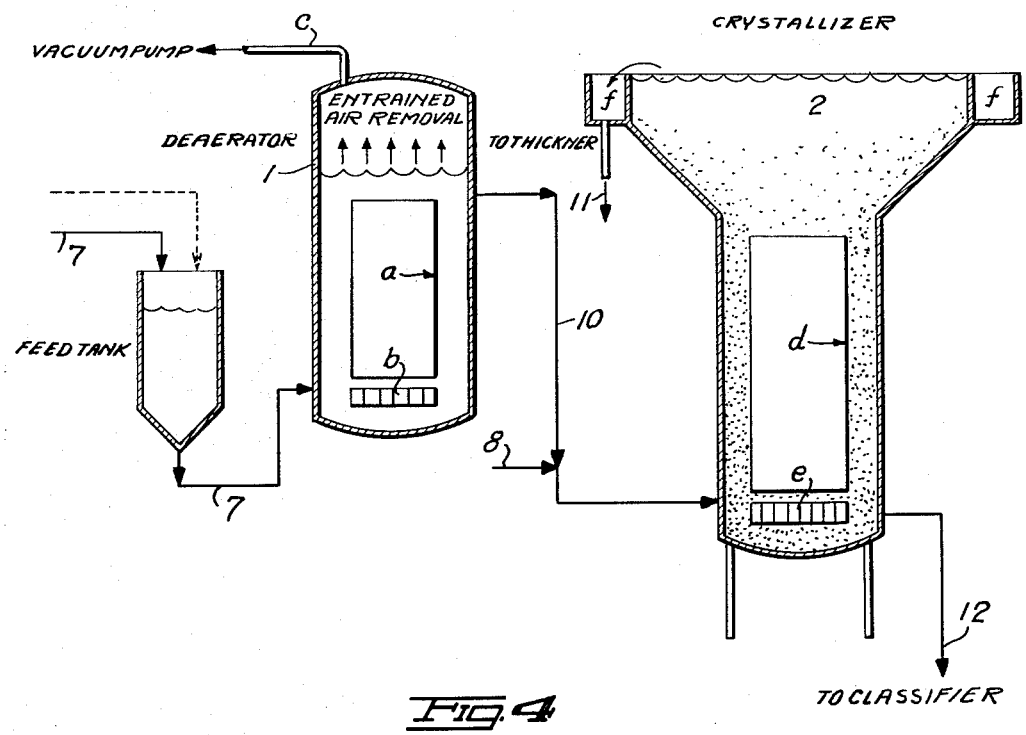

And Figure 4 is a diagrammatic drawing of a portion of the equipment of the process showing particularly the deaerator and the crystallizer.

The separation and recovery of potassium chloride and sodium tetraborate from solutions or brines containing both has heretofore been effected by a cyclic process as described in United States Patent No. 1,712,787 with later improvements as described in United States Patents Nos. 1,787,356, 1,790,436 and 1,921,481. According to the process of the prior art, Searles Lake brine having the approximate composition:

| | Percent |
|---|---|
| KCl | 5.00 |
| $Na_2B_4O_7$ | 1.60 |
| $Na_2CO_3$ | 4.86 |
| $Na_2SO_4$ | 6.85 |
| NaCl | 16.08 |
| $Na_2S$ | 0.08 |
| $H_2O$, by diff. | 65.53 | is mixed with mother liquor 2, the end liquor of the cyclic process as described hereinbelow. This mixture of brine and end liquor is concentrated in triple-effect evaporators to produce a hot concentrated liquor of approximately the following composition:

| | Percent |
|---|---|
| KCl | 19.9 |
| $Na_2B_4O_7$ | 10.5 |
| $Na_2CO_3$ | 6.2 |
| $Na_2SO_4$ | 1.7 |
| NaCl | 6.9 |
| $Na_2S$ | 2.1 |
| $H_2O$, by diff. | 52.7 |

This hot concentrated liquor, at a temperature of approximately 240–250° F. is nearly saturated with potassium chloride, is undersaturated with respect to sodium tetraborate, and is saturated with sodium carbonate, burkeite and sodium chloride. During the concentration step, sodium carbonate monohydrate, sodium chloride, and burkeite are continuously precipitated and separated from the concentrating liquors. Burkeite is a double salt of sodium carbonate and sodium sulfate having the approximate formula $Na_2CO_3 \cdot 2Na_2SO_4$.

The hot concentrated liquor just described is next cooled to precipitate a crop of potassium chloride. Cooling proceeds rapidly in vacuum crystallizers to a temperature of 100–104° F. with a temperature of 100° F. being preferred. This potassium chloride crystallizing process is described in United States Patent No. 1,343,401 and as improved upon in United States Patents Nos. 1,790,436 and 1,921,481.

Time and temperature control are the basic elements involved in the potassium chloride crystallizing step of the cyclic process since simultaneous super-saturation of the concentrated liquor with respect to sodium tetraborate is necessary. The potassium chloride is caused to separate without substantial precipitation of the sodium tetraborate by effecting rapid cooling of the concentrated liquor. The faster the cooling and the shorter the time of retention of the resultant supersaturated end liquor, termed mother liquor 1, the greater will be the satisfaction derived from the entire process.

Figure 3:
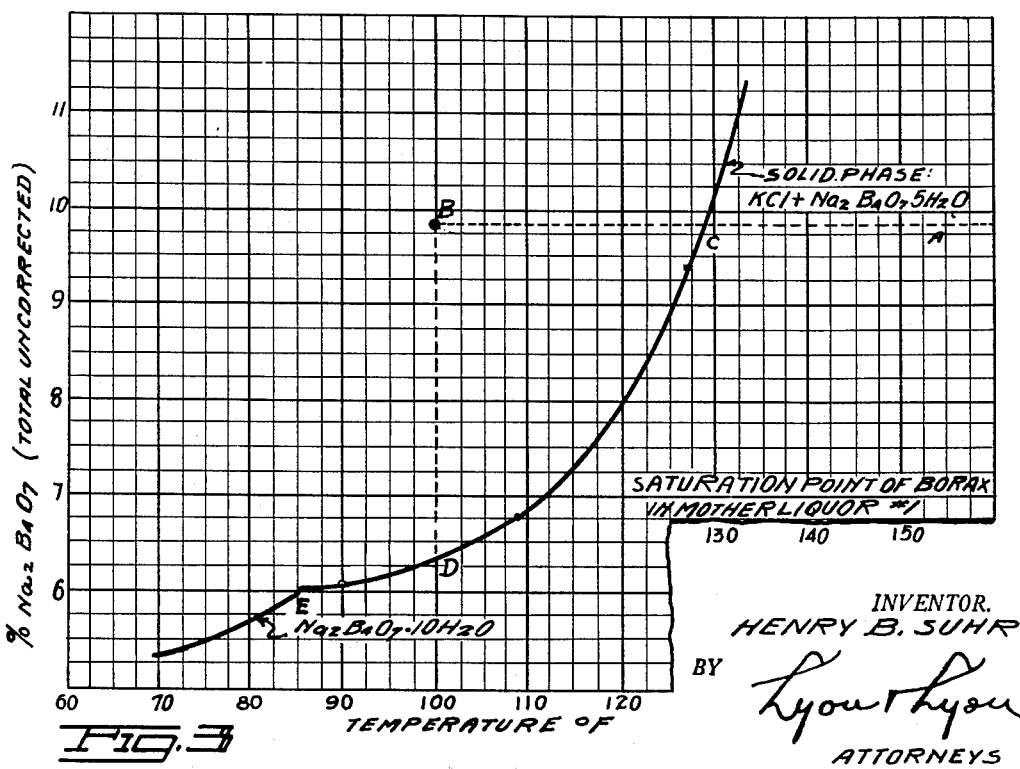
Figure 3 is a graph showing the solubility of sodium tetraborate in concentrated Searles Lake brine over the temperature ranges which may be employed in the present process.

In the preferred process, the concentrated liquor is first diluted to prevent precipitation of sodium chloride on cooling. As cooling proceeds in a series of steps, potassium chloride crystallizes from the liquor. Figure 3, showing the solubility relationships of sodium tetraborate in the liquors of the process, indicates that sodium tetraborate should precipitate from the liquor as the temperature reaches and drops below approximately 125-135° F. However, the sodium tetraborate does not precipitate under the conditions of the process, and potassium chloride crystallization is continued until a temperature of 100-104° F. is reached. In the figure, cooling may proceed from a temperature between 240 and 250° F. along the dotted line AB to a final cooling temperature of 100° F. at point B. Sodium tetraborate solubility is reached as soon as point C is reached at a temperature of 129° F. Supersaturation at point B is represented graphically by the length of the dotted line BD. At lower temperatures than 100-104° F., the liability of incurring spontaneous nucleation of the sodium tetraborate is imminent. The potassium chloride crop, when separated from the liquor, represents a good commercial potassium chloride product. The liquor (mother liquor 1) from which potassium chloride has been precipitated and which proceeds to the sodium tetraborate crystallization step has the following approximate composition:

|  | Percent |
|---|---|
| KCl | 11.68 |
| $Na_2B_4O_7$ | 10.06 |
| $Na_2CO_3$ | 8.61 |
| $Na_2SO_4$ | 2.00 |
| NaCl | 6.44 |
| $Na_2S$ | 1.95 |
| $H_2O$, by diff. | 59.26 |

According to the prior art, sodium tetraborate decahydrate was then crystallized from the Mother Liquor 1 by further cooling to about 75-82° F. Since the supersaturated solution, before the sodium tetraborate decahydrate crystallization, is saturated with potassium chloride, that salt will also crystallize during the second cooling. In addition, the decahydrate salt—the form of sodium tetraborate which crystallizes at these lower temperatures—removes considerable water of crystallization, which is comparable to concentrating the solution, and this also tends to cause deposition of potassium chloride. To prevent contamination of the sodium tetraborate decahydrate with potassium chloride, the Mother Liquor 1 was diluted before cooling to the lower temperature. This dilution is an undesirable feature, since it represents water which must be evaporated from the final mother liquor when it is returned to the evaporation step in the cyclic process. Such dilution water, if not saturated with sodium tetraborate, also prevented crystallization of a certain amount of sodium tetraborate as well as of the potassium chloride.

The present invention voids this costly dilution of the liquor by providing a method of crystallizing relatively pure sodium tetraborate and at the same time holding the potassium chloride in solution. Moreover, this new invention increases the capacity of the entire cyclic system while substantially lowering operating costs.

My invention can best be described by first explaining the action of sodium tetraborate in the liquors of the process. Two solid hydrates of sodium tetraborate are known to exist between the cryohydric point and the boiling point of saturated solutions under ordinary pressure conditions. These hydrates are the pentahydrate ($Na_2B_4O_7.5H_2O$) and the decahydrate ($Na_2B_4O_7.10H_2O$). The transition point of the hydrates in pure water is approximately 143° F. In complex liquors, such as those resulting from the evaporation and manipulation of Searles Lake brine, or similar brines, the transition temperature is essentially lowered. The transition temperature of the pentahydrate to decahydrate in the Mother Liquor 1 has been found to be in the approximate range of 85-90° F., and one such point, E, is shown graphically in Figure 3 at 85° F. At temperatures above the transition point the pentahydrate is stable and is the form in which sodium tetraborate will crystallize. At temperatures below the transition point, the decahydrate is stable and is the form in which sodium tetraborate will crystallize. The supersaturation has been found to be much less stable at temperatures favorable to the formation of the decahydrate than at temperatures favorable to the formation of the pentahydrate, the degree of supersaturation being constant. In other words, it is much easier to maintain a supersaturation of 5% $Na_2B_4O_7$ in excess of saturation at 90-100° F. than to maintain a supersaturation of 5% $Na_2B_4O_7$ in excess of saturation in the temperature region of 75-85° F. Advantage is taken of this characteristic of sodium tetraborate in order to hold the sodium tetraborate pentahydrate in a supersaturated state in the temperature range at which the potassium chloride is precipitated and recovered. Then, in the prior art, the sodium tetraborate was removed by cooling to the temperature range wherein the decahydrate is the stable phase and where the supersaturation is more easily relieved.

The prior procedure of sodium tetraborate crystallization was carried out in a crystallizer as described in United States Patent No. 1,997,277. First, dilution with a liquor saturated with respect to sodium tetraborate but unsaturated with potassium chloride was added to the mother liquor 1 to inhibit the crystallization of potassium chloride when the temperatures were again lowered and thus avoid contamination of the sodium tetraborate decahydrate. The liquor was then cooled by boiling at reduced pressure to between 75 and 82° F., a temperature below the transition point between the pentahydrate and the more easily crystallized decahydrate forms of sodium tetraborate. See Figure 3, point E. Such cooling was performed by the use of refrigeration wherein ammonia was the refrigerating medium. The boiling liquor produced vapors which were condensed on the ammonia coils in the top of the crystallizers, and the condensed vapors then dropped back into the crystallizers. Thus the temperature was regulated by the level of liquor ammonia in the ammonia coils, the transfer of heat being outward from the liquor to the water vapor, to the liquid ammonia, and thence to the ammonia vapors.

Figure 2:
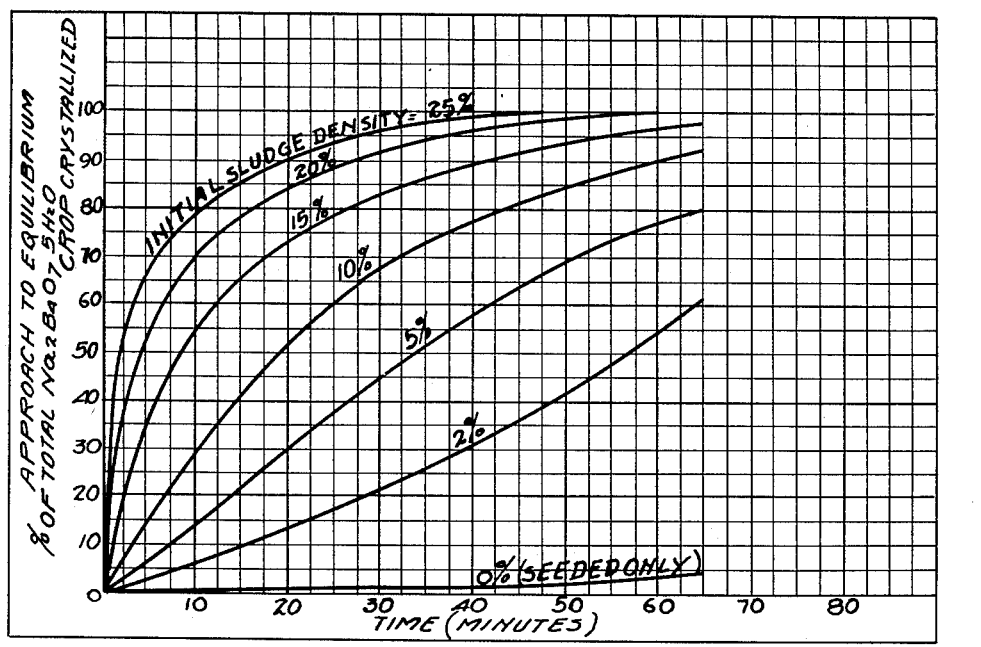
Figure 2 is a chart from which the time necessary to crystallize out a sodium tetraborate pentahydrate crop may be determined, given various initial quantities of the pentahydrate seed in the liquor (plotted as sludge density).

It has been known (United States Patent No. 1,787,356) that this mother liquor 1, which was supersaturated with respect to sodium tetraborate, could be brought to equilibrium without extra cooling. However, the time for such breaking of the supersaturation was excessive and beyond the practical limits of a workable process. I have discovered, however, that this motor liquor 1, which is supersaturated with respect to sodium tetraborate and saturated with potassium chloride, may be brought, practically and economically, to equilibrium with respect to the borate phase without the necessity of further cooling or dilution. Control over the crystallization velocities of the pentahydrate can be excercised by the expedient of varying the amount of crystal surface area in contact with the liquor. When the liquor is merely seeded with pentahydrate, hours or perhaps days are required to reach equilibrium. However, when the liquor is brought into contact with a large quantity of pentahydrate crystals (approximately 20% by weight of the liquor) equilibrium is reached within an hour. Figure 2 graphically shows the time required to crystallize any desired percentage of the available sodium tetraborate as a sodium tetraborate pentahydrate crop, given various initial sludge densities. I found that the sludge density has a direct relationship to the total area of exposed crystal surface if large crystals are continuously removed and replaced by small crystals. In practice, therefore, I substitute the more easily measured sludge densities for the total crystal surface area in charting the above relationships.

It is evident from the graph that close control over the crystallization rate may be maintained by controlling the sludge density. Thus there must be provided means for the removal of coarse crystals and the return of fines in order to maintain a seed bed whose surface area is sufficient for breaking the supersaturation equilibrium in the short time of retention contact. It is important, however, that spontaneous nucleation of pentahydrate crystals be controlled since this produces crystals of such small size that settling becomes a major problem. A small amount of spontaneous nucleation is desired, for without it the crystals may grow to such size as to become difficult to handle. Therefore, there must be provided a combination of equipment, in proper order, suitable for carrying out the improved process of my invention.

The present invention allows the sodium tetraborate crystallization to be effected above the transition point between the pentahydrate and the decahydrate phases, thus obviating the necessity of cooling and thereby avoiding dilution of the liquor. By this means it is feasible to crystallize the pentahydrate crop economically without large inventories of liquor such as would be necessary if the time required for crystallization were lengthened considerably.

By crystallizing the sodium tetraborate at a higher temperature than was practiced in the former art, another perplexing and costly problem is solved. There is present in Searles Lake brine and in the liquors of the cyclic process, certain small amounts of phosphate. In the prior art, when the temperatures were lowered in order to cause the decahydrate to crystallize, a contaminant entered the picture. This contaminant, the complex salt dennisite ($NaBO_2 \cdot Na_3PO_4 \cdot 18H_2O$), precipitated along with the decahydrate. Since for most commercial purposes the presence of phosphate in the sodium tetraborate is undesirable, the dennisite had to be removed by means of a costly leach system. This leach system not only removed the phosphate but also removed the sodium metaborate which is a part of the dennisite molecule, thus depriving the system of borate values which might have been recovered later. The present invention avoids this problem of leaching by precipitating sodium tetraborate pentahydrate at higher temperatures where dennisite crystals do not form.

In the continuous operation of the main cyclic process, the mother liquor 2, from which potassium chloride and sodium tetraborate pentahydrate have largely been removed by the above-described crystallization processes, is returned to the concentration step. The analysis of this mother liquor 2 is approximately:

| | Percent |
|---|---|
| KCl | 11.50 |
| $Na_2B_4O_7$ | 7.61 |
| $Na_2CO_3$ | 9.14 |
| $Na_2SO_4$ | 2.33 |
| NaCl | 7.13 |
| $Na_2S$ | 1.89 |
| $H_2O$, by diff. | 60.40 |

This mother liquor 2 is mixed with raw Searles Lake brine and is sent to the triple-effect evaporators for concentration. These triple-effect evaporators operate with a full flow of steam in order to maintain maximum evaporation at all times. Therefore, the amount of water removed in the concentration process is more or less fixed. By decreasing dilution in the over-all process, as I have done by employing my present invention, increased quantities of brine may be evaporated, thus greatly increasing the capacity of the system and the output of all products throughout the entire cycle.

It may be truly said that my invention has a more far-reaching importance than merely improving the process of crystallization of sodium tetraborate from complex liquors, such as concentrated Searles Lake brine. In the sodium tetraborate crystallization step my invention provides (1) for crystallizing sodium tetraborate pentahydrate at temperatures where phosphate impurities do not appear in the product; (2) for elimination of a costly ammonia refrigeration step in the process; and (3) for the exclusion of an expensive, supplemental phosphate-removal leach system. More important, however, that the improved process of my invention omits the dilution step of the main cycle liquor, thereby liberating a substantial amount of evaporative capacity for the processing of additional quantities of brine and thus producing greater efficiency in the evaporative system. Other lesser advantages and improvements introduced by my invention are also evident.

The present invention, together with various objects thereof, will be best understood from a description of one form or example of a process embodying the invention. There is, therefore, hereinafter described with reference to the accompanying drawing, Figure 1, the preferred form or example of a process and apparatus embodying the invention. The drawing represents a diagrammatic flow sheet of the preferred process incorporating the present invention. For example, 2 represents a suitable sodium-tetraborate-pentahydrate crystallizer, so designed as to permit retention of crystals to any extent necessary to maintain the optimum slurry density; and 3 represents an acceptable classifier of a type which removes the larger pentahydrate crystals and advances them as a product which filters and washes well to the filter feed tank. The smaller crystals which offer a maximum crystal surface area for a given sludge density are retained by classifier 3 and returned to crystallizer 2. Throughout the flow diagram, solid lines depict the flow of solids, fluids, and slurries. The broken lines represent alternative methods of flows.

Figure 1:
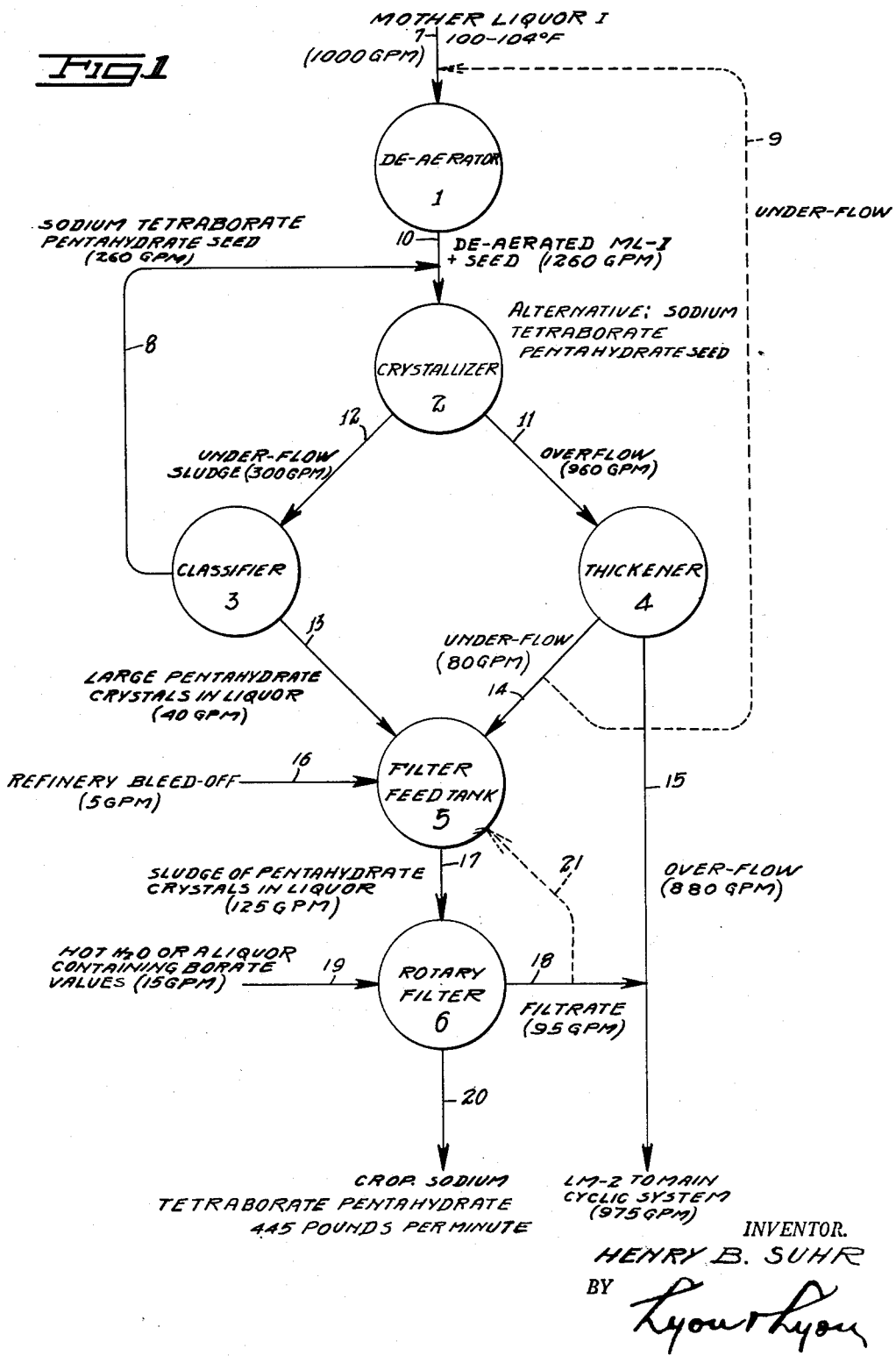
Figure 1 is a diagrammatic flow sheet embodying the preferred process of the present invention.

Referring to Figure 4 there is diagrammatically illustrated that portion of the apparatus which may differ somewhat from the standard equipment, and in Figure 4 the same numbering system is employed as used in connection with Figure 1. The other elements of the apparatus necessary to carry out the process indicated in Figure 1 will be recognized as merely standard equipment.

Now referring to Figure 4, the feed to the process enters through line 7 passing through a feed tank (not numbered) which is not essential to the process but serves as a means for regulating the feed to the deaerator 1. While a single deaerator is shown in practice there may be a number of similar devices operated in parallel and the feed may therefore be split between the same.

The deaerator is merely an enclosed tank in which liquid is agitated about a pachuca "a" by means of an agitator "b," the tank employed being described in Patent No. 2,130,065 in Figure 2. A vacuum pump (not shown) takes suction from the interior of the tank through pipe "c" maintaining a reduced pressure in the space above the liquor level. This reduced pressure is not sufficiently low to cause the liquor in the deaerator 1 to boil but is sufficient to cause air bubbles to expand. Such expansion causes these bubbles to rise rapidly to the surface where they break.

The deaerated liquor then proceeds through line 10 to the crystallizer 2 wherein the contents of the lower cylindrical portion of the crystallizer are agitated about the pachuca "d" by means of an agitator "e." Agitation is sufficient to keep the dense sludge circulating up around the outside of the pachuca and down the center.

Atop the cylindrical portion of the crystallizer is an inverted truncated cone within which the contents are relatively quiescent. The feed to line 10 is in excess of the amount drawn from the crystallizer through line 12 and therefore there is an upward flow through the cone to the overflow launder "f," and out through the overflow line. This overflow liquor contains some fines and proceeds to a thickener through line 11, which may be a standard Dorr thickener.

The heavy sludge in crystallizer 2 is discharged through line 12 to a classifier. This classifier may be any of several types to permit wet classification to separate fine material from coarse material. For example, a standard Dorr raking classifier or some other types of wet classifier might be used.

Referring to the drawings, I will begin the description of the process of the present invention at a point where the mother liquor 1, saturated with potassium chloride and supersaturated with sodium tetraborate, enters the process, as indicated by line 7, at a temperature of 100-104° F. In the normal practice, although it is not absolutely necessary, the mother liquor 1 is directed into the deaerator 1.

Aeration of the mother liquor 1 causes foaming in the sodium tetraborate pentahydrate crystallizer, at times causing a serious loss of valuable pentahydrate seed by flotation. Since this seed is extremely important in keeping positive control of the process, great harm is done by foaming in the crystallizer. Therefore, in the preferred form of the invention the mother liquor 1 is deaerated by maintaining a boiling vacuum in the deaerator.

After the deaerated mother liquor 1 emerges from the deaerator 1 via duct 10, sodium tetraborate pentahydrate seed is introduced by way of line 8 originating from the classifier 3. The seeded liquor then continues through duct 10 and enters the crystallizer 2. The crystallizer 2 consists of an agitated cylindrical portion topped by an inverted frustrum of a cone. The cone portion, being quiescent, forms a settling zone for the seed in the crystallizer and thus separates this seed from the liquor overflowing the cone. The retained seed are kept in suspension in the agitated portion of the crystallizer and the sludge density in this agitated portion is maintained at any desired point by the rate at which the sludge is pumped to the classifier 3.

The overflow from the crystallizer through duct 11 should be protceted from aeration as it flows to the thickener. Therefore, the crystallizer launder is constructed over-size to allow retention of a few minutes' flow. An automatic level control holds a level in the launder to prevent the entrance of air into the overflow pipe.

Whereas, in the prior art the decahydrate crystallizer salted up frequently, thus necessitating regular and frequent shut-downs and wash-outs of equipment, the improved process of the present invention has for all practical purposes eliminated lost time due to wash-outs. The crystals of pentahydrate form a sludge with the mother liquor, and separation is practiced further along in the process, thus allowing a continual flow of material through the pentahydrate crystallizer.

The continuous removal of the coarsest crystals is made possible by circulation of the crystallizer underflow sludge through a suitable classifier 3. Thus sludge or slurry is conducted from the crystallizer 2 through line 12 to the classifier 3. The classifier 3 is an essential part of the pentahydrate process. It removes the larger crystals while retaining the finer crystals which are excellent for seed.

The underflow from the classifier 3 discharges directly into the agitated filter feed tank 5 by way of line 13. This tank 5 has two main functions: (1) it provides surge capacity to minimize the effect of interruptions at the crystallizer or at the filter, and (2) it permits recirculation of the filtrate by means of line 21 and/or the introduction of refinery end liquor by means of line 16. Recirculation of filtrate permits control of the density of the slurry fed to the filter while introduction of refinery end liquor permits the leaching of the small amount of solid-phase potassium chloride which is sometimes present with the sodium tetraborate pentahydrate due to operational solecisms.

The thickener 4 also sends its underflow slurry through the line 14 to the filter feed tank 5. Since this slurry is essentially crystallized sodium tetraborate pentahydrate suspended in mother liquor, it is excellent for seeding mother liquor 1 before it enters the crystallizer 2. Therefore, a portion of this slurry may be conducted from the thickener 4 through line 9 to the deaerator 1, where it is mixed as additional seed with the mother liquor 1.

The clear overflow from the thickener 4 is returned by way of line 15 to the main cyclic system where it is mixed with brine and various other end liquors and serves as pan feed for the concentration process.

Provision is made, as indicated by line 16, for recycling a limited amount of borax refinery bleed-off to the filter feed tank 5. This refinery bleed-off serves two functions: (1) it dissolves any small amount of KCl that may be present; and (2) it lowers the density of the slurry present in the filter feed tank and thus makes the slurry easier to handle.

From the filter feed tank 5 the slurry of pentahydrate crystals in liquor is pumped, or sent by other suitable means, through duct 17 to an appropriate filter 6.

Filter 6 represents any suitable type of filter, atlhough I have found a standard rotary vacuum filter quite satisfactory. Since the pentahydrate crystals settle and filter relatively rapidly, the speed of the filter bowl agitator and the drum drive should be adjusted accordingly. Also the filter cake may harden to a troublesome degree if cold air is drawn through it. Such hardening is caused by reducing the temperature of the cake to the point where conversion of pentahydrate to decahydrate begins to take place. Therefore, the pentahydrate filter cake must be washed on the filter with hot water or a hot liquor containing borate values, through line 19. Similarly, steam should be used rather than air for blowing the cake from the fitler screen.

A crop of sodium tetraborate pentahydrate crystals are obtained after filtering as indicated by line 20.

The filtrate from the filter 6 issues from the filter by way of line 18. The filtrate joins the overflow liquor from the thickener 4 and the resultant mixture is termed mother liquor 2. This mother liquor 2 is returned to the main cyclic system, as explained hereinabove.

The sodium tetraborate pentahydrate crystals obtained by this process are sufficiently pure for a limited number of commercial uses. However, they must be further purified by recrystallization for most uses. The purification or refinery steps include complete dissolution by heating in a recycled refinery end liquor, filtration to remove insoluble matter, cooling to crystallize a refined product, filtration to separate the product from the refinery end liquor which returns to the beginning of the refinery cycle, and drying of the filtered product. In the prior art refinery end liquor was used to dilute mother liquor 1 to prevent crystallization of potassium chloride while cooling to precipitate a crop of sodium tetraborate decahydrate. This use constituted the dilution which is eliminated in the process of my invention.

One other object of my invention becomes apparent when considering the refinery cycle. In the process as practiced by the American Potash & Chemical Corporation use of dilution was required in the prior art for three reasons: (1) to prevent crystallization of potassium chloride in the sodium tetraborate decahydrate crystallizers; (2) to remove impurities such as phosphates entering the refinery cycle with the crude sodium tetraborate decahydrate; and (3) to keep the volume of liquors in the refinery cycle from becoming excessive. My invention eliminates the need for dilution to prevent crystallization of potassium chloride since no cooling occurs and, therefore, no potassium chloride precipitates in the sodium tetraborate pentahydrate crystallizers. My invention does not eliminate the need for bleeding impurities from the refinery cycle, but the amount of bleed required to maintain tolerable impurity levels in the refinery cycle is drastically reduced as a result of the major reduction in the amount of impurities entering the refinery cycle. The sodium tetraborate pentahydrate of my invention is much purer than the sodium tetraborate decahydrate of the prior art. No phosphates are present in the pentahydrate and the pentahydrate crystals are larger and more easily washed. Finally, my invention eliminates the need for removing water from the refinery cycle to reduce liquor volumes. Such reduction in liquor volume is effected by the fact that sodium tetraborate pentahydrate, $Na_2B_4O_7.5H_2O$, is fed into the refinery cycle while the end product of the refinery is sodium tetraborate decahydrate, $Na_2B_4O_7.10H_2O$. Therefore, excess water leaves the refinery cycle in the final product which contains twice as much water as the feed.

The end result of my invention is a drastic reduction in the bleed from the refinery cycle and a consequent increase in the efficiency of the cycle. The bleed from the refinery cycle enters the process of my invention through line 16 of Figure 1.

As a specific example of the preferred form of my process, the deaerator 1 may handle a flow of liquor equal to 1000 G. P. M. This flow of 1000 G. P. M. plus the 260 G. P. M. which enters by way of line 8 continues through line 10 to the crystallizer 2 which may have a capacity of 36,000 gallons. Approximately 960 G. P. M. will be overflow liquor which passes through duct 11 to the thickener 4. The remaining 300 G. P. M. will be sent to the classifier 3 through line 12. Approximately 260 G. P. M. of seed slurry may be sent from the classifier 3 through line 8 to join duct 10, and 40 G. P. M. is conducted from the classifier 3 through line 13 to the filter feed tank. Of the 960 G. P. M. entering thickener 4, 880 G. P. M. may overflow through line 15 while the remainder, 80 G. P. M., will leave the thickener through line 14 as a thick slurry. This underflow joins the underflow of 40 G. P. M. from classifier 3 to enter filter feed tank.

To the thick slurry in filter feed tank 5 are added approximately 5 G. P. M. of refinery end liquor by way of line 16. This latter vessel thus receives a total of 125 G. P. M. of incoming slurry and liquor. This 125 G. P. M. passes through line 17 to the filter 6. As indicated by line 19, hot water or a liquor containing borate values, as desired, is added as a wash at filter 6 at a rate of 15 G. P. M. The filtrate leaves the filter through line 18 at a rate of 95 G. P. M. The sodium tetraborate pentahydrate product exits by way of conveyor 20 at a rate of approximately 445 pounds per minute on a wet basis or 400 pounds per minute on a dry basis.

The 880 G. P. M. which overflows the thickener through line 15 is combined with the 95 G. P. M. filtrate from filter 6. Now known as mother liquor 2, the total of these two returns to the main cyclic system at a rate of 975 G. P. M.

The process is continuous. A heavy seed bed is maintained in crystallizer 2 by the process described. Large crystals are continuously removed from this seed bed to preserve a high ratio of crystal surface to sludge density, the latter being relatively constant. Occasionally, additional seeding may be obtained by introducing a portion of the underflow from thickener 4 into the deaerator 1 by means of line 9. Some crystallization may thus occur in deaerator 1 before the mother liquor 1 reaches crystallizer 2.

As indicated in Figure 2, the rate at which crystallization may occur of the pentahydrate crystals in the crystallizer 2 is dependent on the sludge density. I, therefore, contact the liquor in the crystallizer 2 with at least 10%, and preferably 20%, of sodium tetraborate pentahydrate crystals of the weight in liquor in said crystallizing zone.

While the particular process herein described is well adapted to carry out the objects of the present invention, it is to be understood that the invention is in no wise considered to be limited to the particular process or products herein described, but includes all such modifications and changes as come within the scope of the appended claims.

I claim:

1. A process of separating sodium tetraborate from a Searles Lake brine after a concentration of the brine and precipitation of potassium chloride to form a solution supersaturated at temperatures above 100° F. with sodium tetraborate and essentially saturated with sodium sulfate, sodium carbonate and sodium chloride, which comprises, passing such liquor into a crystallizing zone wherein it is maintained at a temperature of about 100 to 104° F. and contacted with at least 10% of its weight of sodium tetraborate pentahydrate crystals, removing the liquor and crystals from the crystallizing zone, separating therefrom the larger crystals, and returning a portion of the liquors with the small pentahydrate crystals to the crystallizing zone.

2. A process for separating sodium tetraborate from the mother liquor resulting from the cyclic process for the concentration of Searles Lake brines essentially to saturation with potassium chloride, the removal of sodium salts consisting for the major part of sodium chloride, burkeite, and sodium carbonate monohydrate from the concentrated liquor, the dilution of the concentrated liquor to prevent precipitation of sodium chloride during subsequent cooling, the cooling of the diluted concentrated liquor to the neighborhood of 100° F. to precipitate a crop of potassium chloride, and the separating of the potassium chloride crop from said mother liquor, said mother liquor being supersaturated with sodium tetraborate and essentially saturated with potassium chloride, sodium chloride, sodium carbonate, and sodium sulfate, in which process said mother liquor is passed into a crystallizing zone wherein the temperature of the mother liquor is not permitted to drop below between 85 and 90° F., the transition point of sodium tetraborate pentahydrate to sodium tetraborate decahydrate, and wherein the mother liquor is contacted with sodium tetraborate pentahydrate crystal seed to precipitate sodium tetraborate pentahydrate upon said seed while reducing the supersaturation of the liquor with respect to sodium tetraborate, and subsequently separating the precipitated sodium tetraborate pentahydrate from the end liquor.

3. A process for separating sodium tetraborate from the mother liquor resulting from the crystallization of potassium chloride in the cyclic process for concentrating Searles Lake brine, said mother liquor being essentially saturated with potassium chloride and containing sodium chloride, sodium carbonate and sodium sulfate, and supersaturated with sodium tetraborate pentahydrate at a temperature between 104° F and above the transition temperature between sodium tetraborate pentahydrate and sodium tetraborate decahydrate, which process comprises, passing such mother liquor into a crystallization zone wherein the temperature is not permitted to drop below said transition temperature which lies in a range from 85 to 90° F., agitating the liquor with sodium tetraborate pentahydrate seed to reduce the supersaturation of the liquor with respect to sodium tetraborate, withdrawing from the upper portion of said zone an end liquor containing fine crystals of sodium tetraborate, separating the end liquor while returning the fine crystals of sodium tetraborate as seed to the crystallization zone, withdrawing from the lower end of said zone a sludge of liquor and crystals, classifying the crystals into relatively large crystals and relatively small crystals, recovering the relatively large crystals of sodium tetraborate as a product while returning the fine crystals with the accompanying liquor as additional seed to the crystallization zone, and regulating the withdrawal of relatively large crystals from the crystallization zone to maintain in said zone at least 10 percent of sodium tetraborate pentahydrate seed crystals of the weight of the liquor in said zone.

4. In a continuous and cyclic process for the recovery of sodium tetraborate pentahydrate from Searles Lake brine whereby the brine is concentrated by evaporation in respect to sodium tetraborate and potassium chloride while precipitating sodium chloride, burkeite, and sodium carbonate monohydrate, whereby the concentrated liquor is diluted to prevent crystallization of sodium chloride on subsequent cooling, whereby the concentrated liquor is cooled to between 98° and 104° F. to precipitate potassium chloride while maintaining sodium tetraborate pentahydrate in a supersaturated state, whereby the crystallized potassium chloride is separated from the liquor whereby the supersaturation of the liquor with respect to sodium tetraborate pentahydrate is subsequently relieved to produce a crop of sodium tetraborate pentahydrate, and whereby the end liquor is returned to mix with the raw Searles Lake brine at the start of the process for further concentration, the step of recovering sodium tetraborate pentahydrate resulting from passing the end liquor from the potassium chloride precipitation step into a crystallization zone wherein the temperature is not appreciably changed from the 98° to 104° F. temperature at which the end liquor left the potassium chloride precipitation step and wherein the liquor is in no case permitted to drop below the transition temperature from sodium tetraborate pentahydrate to sodium tetraborate decahydrate existing in the range from 85° to 90° F., contacting said liquor with sodium tetraborate pentahydrate crystal seed in a slurry density wherein the weight of the crystals is at least 10 percent of the weight of the liquor, continuously withdrawing a portion of the slurry from the bottom of the crystallizing zone, classifying and separating from the portion the larger sodium tetraborate pentahydrate crystals as a product, and returning the smaller sodium tetraborate crystals to the crystallizing zone, and continuously withdrawing the overflow from the crystallizing zone, separating and returning to the crystallizing zone any solid sodium tetraborate pentahydrate in said overflow, and passing the clarified overflow from the sodium tetraborate pentahydrate crystallization step of the over-all process.

5. In a continuous and cyclic process for the recovery of sodium tetraborate pentahydrate from Searles Lake brine whereby the brine is concentrated by evaporation in respect to sodium tetraborate and potassium chloride while precipitating sodium chloride, burkeite, and sodium carbonate monohydrate, whereby the concentrated liquor is diluted to prevent crystallization of sodium chloride on subsequent cooling, whereby the concentrated liquor is cooled to between 98° and 104° F. to precipitate potassium chloride while maintaining sodium tetraborate pentahydrate in a supersaturated state, whereby the crystallized potassium chloride is separated from the liquor, whereby the supersaturation of the liquor with respect to sodium tetraborate pentahydrate is subsequently relieved to produce a crop of sodium tetraborate pentahydrate, and whereby the end liquor is returned to mix with the raw Searles Lake brine at the start of the process for further concentration, the step of recovering sodium tetraborate pentahydrate resulting from passing the end liquor from the potassium chloride precipitation step first into a deaerating zone and then into a crystallization zone wherein the temperature is not appreciably changed from 98° to 104° F. temperature at which the end liquor left the potassium chloride precipitation step and wherein the liquor is in no case permitted to drop below the transition temperature from sodium tetraborate pentahydrate to sodium tetraborate decahydrate existing in the range from 85° to 90° F., contacting said liquor with sodium tetraborate pentahydrate crystal seed in a slurry density wherein the weight of the crystals is at least 10 per cent of the weight of the liquor, continuously withdrawing a portion of the slurry from the bottom of the crystallizing zone, classifying and separating from this portion the larger sodium tetraborate pentahydrate crystals as a product and returning the smaller sodium tetraborate crystals to the crystallizing zone, separating and returning to the crystallizing zone any solid sodium tetraborate pentahydrate in said overflow, and passing the clarified overflow from the sodium tetraborate pentahydrate crystallization step of the over-all process.

References Cited in the file of this patent

UNITED STATES PATENTS

| Number | Name | Date |
|---|---|---|
| 1,814,300 | Duschak | July 14, 1931 |
| 1,991,410 | Newman | Feb. 19, 1935 |
| 2,094,881 | Gale | Oct. 5, 1937 |
| 2,528,481 | Wiseman | Oct. 31, 1950 |

OTHER REFERENCES

Chemical Engineering, August 1951, pages 104–106.